April 5, 1960 F. CIRILLO 2,931,382
EMERGENCY WATER TANK
Filed Sept. 17, 1956
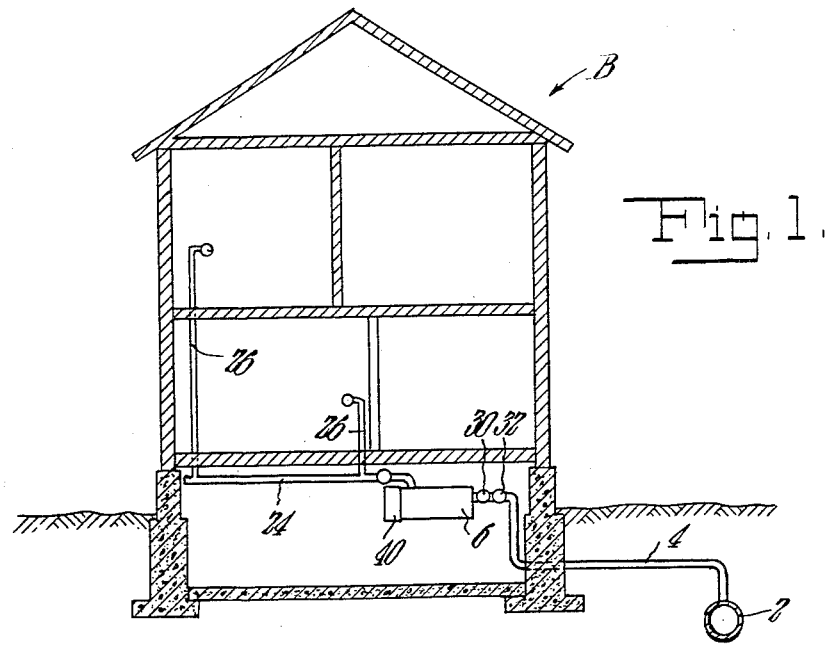
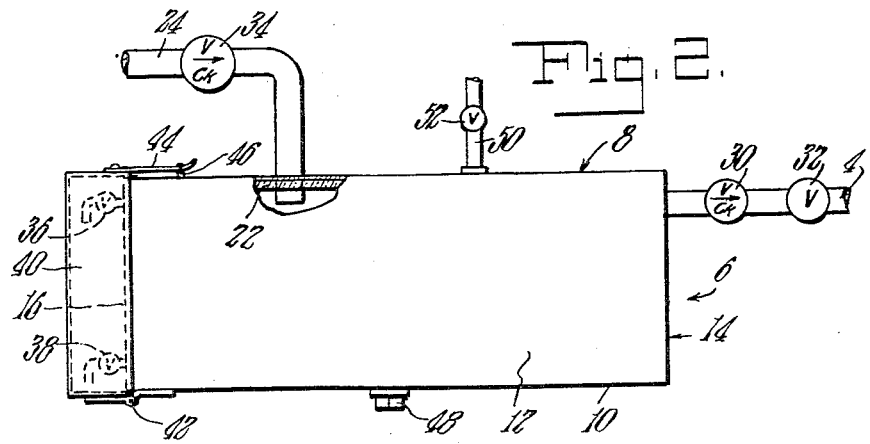
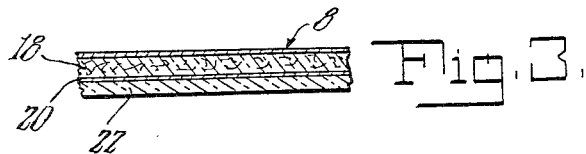
INVENTOR.
Frank Cirillo.
BY Ross & Ross, Atty.

United States Patent Office 2,931,382
Patented Apr. 5, 1960

2,931,382
EMERGENCY WATER TANK
Frank Cirillo, Wilbraham, Mass., assignor of one-half to Sebastian Scata, Springfield, Mass.
Application September 17, 1956, Serial No. 610,347
3 Claims. (Cl. 137—357)

This invention relates to improvements in emergency water supply apparatus for a building, such as a dwelling.

The principal object of the invention is directed to the provision of apparatus to insure a water supply for a building in the event that the water supply thereto is interrupted, or disabled.

Water supply to a building, such as a dwelling, is likely to be cut-off so that the building is without water. Such cut-off may be the result of a rupture of the main supply or entrance connection, which may be caused by and explosion, severe storm, bombing or similar event.

The apparatus of the invention is such that water from the service entrance to the water distributing system of the building flows through an emergency storage tank. In the event of cut-off of water supply, there is a tank full of water for emergency use.

Water from the service entrance flowing through the emergency tank maintains water therein in a fresh, non-stagnant condition so that, in an emergency, water in a usable condition is available.

The novel features of the apparatus of the invention will be hereinafter described in the form at present preferred, in connection with the accompanying drawings, wherein:

Fig. 1, is a diagrammatic sectional elevational view through a dwelling showing the apparatus of the invention associated therewith;

Fig. 2, is a side elevational view of the emergency tank of the invention; and

Fig. 3, is a sectional view of a portion of the wall of the tank to illustrate the construction thereof.

Referring now to the drawings more in detail, the novel features of the invention will be described.

A building, which may be a dwelling, is represented by B. It will be understood that the apparatus is adapted for use in buildings, generally of any type.

A water supply main is shown at 2, and a service entrance 4 extends therefrom to an emergency tank 6.

Said tank 6 may be of any desired shape and capacity, as for example for an ordinary dwelling, same may have a capacity of fifty or one hundred gallons.

The tank has upper and lower walls 8 and 10, side walls 12, and end walls 14 and 16. A suitable tank will have metal walls with fiber glass 18 thereagainst which is covered with a lead sheath 20. The inner side of the sheath will be coated with glass or porcelain 22, see Fig. 3. The coating 22 will provide a clean, sanitary surface for the water. The lead sheath will prevent contamination of the water in the tank, as could be caused by radiation, resulting from bomb explosions.

A water distributing main 24 extends from the tank 6 from which may extend various distributing pipes, such as 26.

As will be seen, water from the main flows through the service entrance 4, through the distributing system at all times.

The distributing main 24 terminates close to the uppermost wall of the tank so as to obviate the danger of a syphon action in the event the supply of water to the tank 6 is cut-off.

A check valve 30 in the service entrance 4 prevents the flow of water from the tank so as to preserve the emergency supply of water in the tank, should the main supply be cut-off.

There will be a shut-off valve 32 in the service entrance to shut off water to the tank, and in the case of emergency to safeguard against the flow of water from the tank past the check valve.

There will be a check valve 34 in the distributing pipe 24, as indicated.

The end wall 16 of the tank adjacent the upper side thereof will have a shut-off valve 36 so that the tank may be relieved of entrapped air, when desired or necessary.

Also in said end wall there will be a draw-off valve 38 for use in drawing water in an emergency.

A closure 40 is hinged to the tank at 42, and in the closed position thereof, a flexible hasp 44 secured thereto engages a pin 46, or the like to releasably hold the closure in position to enclose the valves 36 and 38.

There will be a draw-off plug 48 in the bottom of the tank 6, for use should it be desirable to drain the tank.

A pipe 50, connected to the tank, has a valve 52 therein and may be connected to means for the purpose of fluorination of the water should that be desirable.

It will be observed that the tank is in series with the service entrance and distributing system, so that as water is used it flows through the tank. In this way the tank is continuously filled with water.

In the event the supply of water to the tank is cut-off, the check valve 30 prevents outward flow of water. The valve 32 is further assurance against the loss of water in case of emergency.

The closure protects the valves 36 and 38 against damage yet it is readily removable in the event of an emergency, so as to make said valves accessible.

The novel features of the invention have been disclosed in the form at present preferred and it is desired to be limited, if at all, by the following claims, rather than by the foregoing description.

What it is desired to claim and secure by Letters Patent of the United States is:

1. The combination with a main water supply and water distributing system of a building of apparatus for the normal flow of water from said main supply to said distributing system adapted to provide an emergency supply of water on failure of said main supply comprising in combination, a horizontal closed water tank having an upper wall and end walls, a water connection between said tank and main water supply including a check valve to check the flow of water from said tank to said main water supply on failure thereof, a water distributing main connecting the upper wall of said tank and said water distributing system having an entrance end disposed closely adjacent said upper wall, a check valve in said distributing main to check the flow of water from said main to said tank, an air relieving valve in an end wall of said tank adjacent the upper wall thereof, and a draw off valve in said end wall.

2. Apparatus set forth in claim 1 wherein said tank on inner sides of the walls thereof is coated with fiber glass covered by a sheath of lead.

3. Apparatus as set forth in claim 1 including a valved connection leading into said tank and connected to a means for fluorinating the water in said tank.

References Cited in the file of this patent

UNITED STATES PATENTS

| | | |
|---|---|---|
| 1,543,257 | Greenberg | June 23, 1925 |
| 1,609,359 | Humphrey | Dec. 7, 1926 |
| 1,643,223 | O'Dowd | Sept. 20, 1927 |
| 2,255,460 | Weaver | Sept. 9, 1941 |
| 2,494,044 | Jurisich | Jan. 10, 1950 |
| 2,698,027 | Branson | Dec. 28, 1954 |

FOREIGN PATENTS

| | | |
|---|---|---|
| 32,593 | Austria | Apr. 10, 1908 |